May 18, 1926.

S. S. SWANSON 1,584,904

CONTROLLING MEANS FOR SPREADER DRIVING MECHANISM

Filed May 5, 1924      2 Sheets-Sheet 1

Inventor:
Stanley S. Swanson
by S.C. Shontz  Atty.

May 18, 1926.
S. S. SWANSON
1,584,904
CONTROLLING MEANS FOR SPREADER DRIVING MECHANISM
Filed May 5, 1924   2 Sheets-Sheet 2
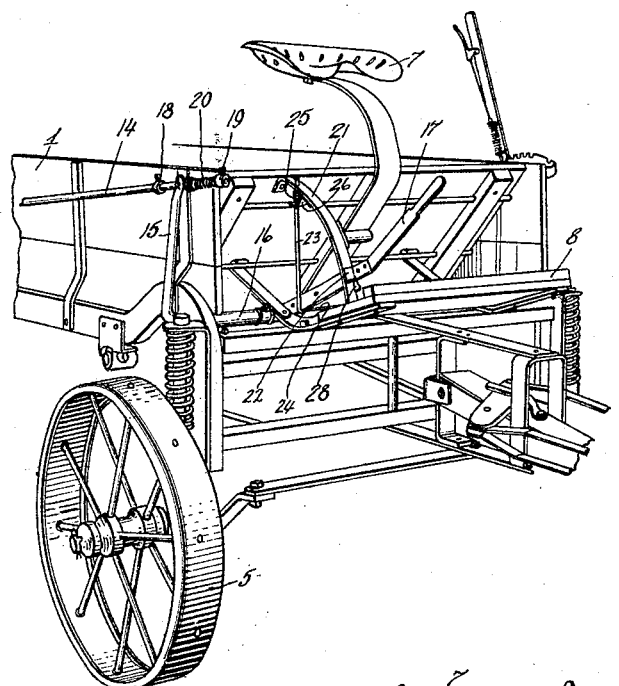
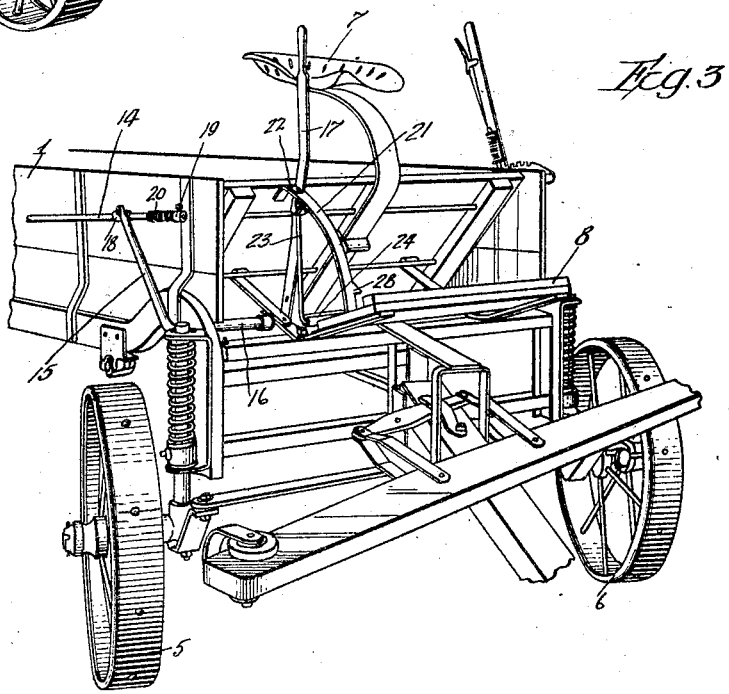
Inventor:
Stanley S. Swanson Patented May 18, 1926.

1,584,904

UNITED STATES PATENT OFFICE.

STARLEY S. SWANSON, OF STOUGHTON, WISCONSIN, ASSIGNOR, BY MESNE ASSIGNMENTS, TO MOLINE IMPLEMENT COMPANY, A CORPORATION OF ILLINOIS.

CONTROLLING MEANS FOR SPREADER DRIVING MECHANISM.

Application filed May 5, 1924. Serial No. 711,101.

The invention relates to controlling means for spreader driving mechanisms.

It relates particularly to a combined hand and foot control mechanism for throwing the driving mechanism of a spreader into and out of operation.

A spreader is usually controlled by an operator who occupies a seat at the front of the spreader. The mechanisms to be controlled are all located to the rear of the spreader, making it necessary for the controlling elements to be brought forward and manipulated from the front. The operator usually has both hands occupied with the lines driving the team. It is necessary, however, for him to throw the spreader mechanism into operation at the proper time in order to distribute the fertilizer at the right point. If his team should be restless it may require both hands to control the horses, leaving very little time to throw the spreader mechanism into operation. This mechanism is usually heavy and the parts are such that they must be thrown rather positively into engagement, with the total result that the ordinary hand levers are often inconvenient and difficult to manipulate at the proper moment. The present invention has been devised to overcome these difficulties by making it possible for the operator to trip the spreader mechanism into gear with his foot and move it to final position with his foot while both arms are occupied with the team.

The general object of the invention is to provide an improved controlling means for the driving mechanism of a spreader.

A more specific object is to provide a simple lever mechanism which can be tripped into operation by the foot of the operator, moved to final position by his foot and returned to inoperative position by hand.

Other objects and advantages of the invention will appear from the specification and drawings.

An embodiment of the invention is illustrated in the drawings in which—

Figure 2 is a perspective of the front end of the spreader showing the controlling mechanism as it is being moved to throw the driving mechanism into gear.

Figure 3 is a perspective of the front end of the spreader showing the controlling mechanism in the position it occupies for holding the driving mechanism in disconnected position.

Figure 1:
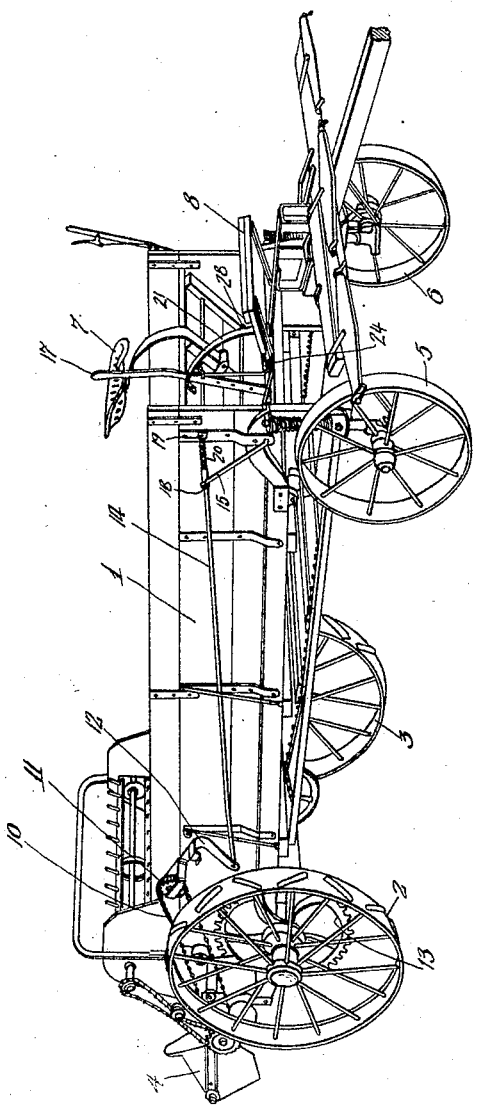
Figure 1 is a perspective view of the side of the spreader on which the driving mechanism is located.

The spreader includes the usual box 1, a pair of rear drive wheels 2 and 3, a distributing mechanism 4, a forecarriage having two wheels 5 and 6, an operator's seat 7, and a foot board 8.

The driving mechanism includes a chain 10 running over a sprocket 11 carried by a bell crank lever 12 pivoted to the body of the spreader. The chain is connected to the spreading mechanism on the rear of the spreader and it is adapted to be thrown into and out of engagement with a sprocket 13 driven by the rotation of the rear drive wheels. The bell crank lever 12 is positioned so that the weight of the parts normally throws the chain into engagement with the sprocket wheel.

The bell crank lever is held in a position to keep the chain out of engagement with the sprocket wheel by a control rod 14 connected to the arm 15 of a shaft 16 pivoted at the front end of the spreader. This shaft is controlled by a hand lever 17 fixed to it. The rod 14 passes loosely through an opening in the end of the arm 15 and fixed to the rod are two stops 18 and 19. Between the stop 19 and the arm 15 is a spring 20. When the lever 17 is in its rearward position illustrated in Figures 1 and 3, the arm 15 is in engagement with the stop 18 and the controlling rod 14 holds the bell crank lever in the position illustrated in Figure 1 with the drive chain 10 out of engagement with the sprocket wheel 13. As the lever 17 is moved forwardly and downwardly from this position, the arm 15 moves forwardly. As the arm 15 moves out of engagement with stop 15, the weight of the parts moves the drive chain 10 downwardly into engagement with the sprocket wheel. As the movement of lever 17 continues the arm 15 engages the spring 20 and the final movement of the arm resiliently biases the control rod 14 forward to resiliently force and hold the bell crank lever 12 in a position to cause the chain 10 to engage the driving sprocket 13.

The lever 17 moves along one side of a segment 21 and the lever carries a horizontal projection 22 moving over the top of the segment. Projecting through a hole in the segment near its top is a latch 23 pivoted at its lower end to a foot plate 24, the forward end of which is in turn pivoted to the foot board 8. The latch is biased upwardly by a spring 25 bearing at one end on a projection 26 and having its other end connected to latch 23. The upper end of the latch 23 projects through a hole in the segment and it is beveled so that, as the lever 17 is moved toward its vertical position, it moves over the latch but, after it has moved past the latch the latter projects in front of the projection 22 and holds the lever 17 in vertical position.

The latch may be released by pressing downwardly on the foot plate 24 which moves the latch 23 downwardly and from in front of the projection 22 so that the weight of the driving mechanism moves it to driving position and simultaneously swings the lever 17 downward and forward. The lever is not moved to its final position by the driving mechanism but to a position such as illustrated in Figure 2. In this position the operator can easily put his foot on the lever to hold it and he can move it downwardly with his foot to a final position such movement being against the resilient action of the spring 20.

The lever 17 is positioned on the side of the operator such that his foot normally causes it to contact the edge of the segment and the lower edge of the segment is provided with a catch 28 over which the lever may be moved and which holds it in its final position. The segment 21 and the lever are positioned relative to one another so that the lever will normally be held against the side of the segment by its own resiliency. Its normal position, assuming that the segment 21 were removed, being a little to the left of the edge of the segment.

When the operator desires to disconnect the driving mechanism he can reach down, pull the lever sideways to unlock it and then pull it upwardly to its vertical position where it will be automatically locked to hold the driving mechanism in disconnected position.

There has thus been provided a controlling mechanism which can be easily operated by the foot of the driver when he has both hands occupied driving the team. He can easily kick the latch thereby tripping the driving mechanism which will automatically move into working position. As it moves to working position, the controlling lever moves to a position where the driver can easily put his foot on it to hold it in working position or he can push it to locked position with his foot.

The disconnection of the driving means is not so important as the moving of it to working position. The driver can disconnect the driving means when it is convenient for him to do so by a simple movement of the hand lever.

It will be understood that the construction shown is for purposes of illustration only and that variations may be made in it without departing from the spirit and scope of the invention as defined by the claims.

I claim:

1. A spreader having spreading devices, an operator's seat located near the front end of the spreader, driving mechanism for the spreading devices normally urged toward driving position, and control means connected to the driving mechanism for controlling the movement of said mechanism to and from driving position, said control means including a latch for holding it in position to hold the driving mechanism in non-driving position and a latch for holding it in position to hold the driving mechanism in driving position, said control means also including a device operable by the foot of an operator on the operator's seat for releasing the control means when it is in position to hold the driving mechanism in non-driving position to thereby permit the driving mechanism to automatically move to driving position, said control means, when released, being in a position where it may be easily engaged by the foot of an operator on the operator's seat to hold it in position to hold the driving mechanism in driving position and to move it to position to be locked by the second latch.

2. In a spreader, a driving mechanism normally biased to driving position, means operable by a hand lever for moving the driving mechanism to disconnected position, said lever occupying a substantially vertical position when the driving mechanism is in inoperative position, a latch mechanism for holding the hand lever in its vertical position, a foot operated mechanism for releasing the latch, said hand lever being positioned so that, as it is moved downwardly by the driving mechanism after it has been released by the latch, it moves to a position where it may be easily engaged by the foot of an operator to push it to a final position for holding the driving mechanism in driving position.

3. In a spreader, a driving mechanism normally biased to driving position, controlling means for the driving mechanism operated by a lever, a segment over which said lever operates, a latch at one end of the segment for holding the lever in a substantially vertical position to hold the driving mechanism in inoperative position, a foot operated mechanism for releasing the lever to permit the driving mechanism to move to driving position and move the lever downwardly, said lever being located so that, after it has been moved downwardly by the driving mechanism it is in position to be moved by the foot of the operator to be pushed further downwardly to be engaged in a notch in the segment to hold the driving mechanism in driving position.

In testimony whereof, I affix my signature.

STARLEY S. SWANSON.